United States Patent

Akiyama et al.

[15] 3,674,929

[45] July 4, 1972

[54] DEMODULATION SYSTEM REGENERATING CARRIER WAVES PHASE SYNCHRONIZED WITH CORRESPONDING CARRIER WAVE COMPONENTS IN HORIZONTAL SYNCHRONIZING PULSE MODULATED CARRIER WAVES

[72] Inventors: Susumu Akiyama; Mitsuaki Naganuma, both of Tokyo, Japan

[73] Assignee: Nippon Electric Company, Limited, Tokyo, Japan

[22] Filed: Oct. 17, 1969

[21] Appl. No.: 867,306

[30] Foreign Application Priority Data

Dec. 9, 1968 Japan....................................43/89729

[52] U.S. Cl. ..............................178/7.3 R, 325/49, 325/329

[51] Int. Cl...........................................H04n 5/44, H04b 1/68

[58] Field of Search......................178/7.3 R, 69.5 TV, 7.3 S, 178/7.5 S; 325/49, 329

[56] References Cited

UNITED STATES PATENTS

| | | | |
|---|---|---|---|
| 3,144,512 | 8/1964 | McAllan et al | 178/7.3 R |
| 3,444,477 | 5/1969 | Avins | 178/69.5 TV |

*Primary Examiner*—Robert L. Griffin
*Assistant Examiner*—George G. Stellar
*Attorney*—Marn & Jangarathis

[57] ABSTRACT

A receiver for a vestigial sideband television signal having a low excess carrier ratio regenerates the carrier for demodulation of that signal by means of a sampling gate and a filter. The sampling gate samples the received signal during the synchronizing intervals therein under control of a gate signal which is developed by the subtraction of the envelope of the regenerated carrier from the envelope of the in phase sum of the regenerated carrier and the received signal. The regenerated carrier is supplied to the demodulator through an Automatic Phase Control system.

10 Claims, 4 Drawing Figures

Figure 1A:
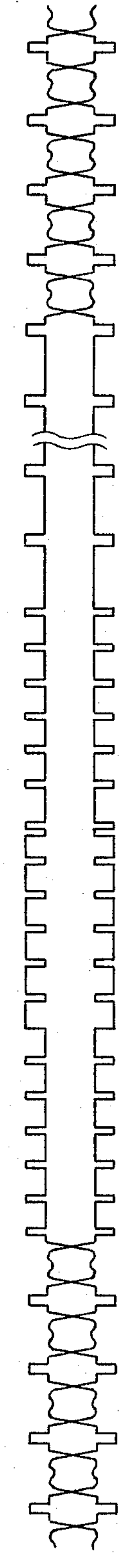

INVENTORS
Susuma Akiyama
Mitsuaki Naganuma
BY
Marn & Jangarathis
ATTORNEYS

INVENTORS
Susuma Akiyama
Mitsuaki Naganuma
BY
Marn & Jangarathis
ATTORNEYS

INVENTORS
Susuma Akiyama
Mitsuaki Naganuma
BY
Marn & Jangarathis
ATTORNEYS

INVENTORS
Susuma Akiyama
Mitsuaki Naganuma
BY
Marn & Jangarathis
ATTORNEYS

DEMODULATION SYSTEM REGENERATING CARRIER WAVES PHASE SYNCHRONIZED WITH CORRESPONDING CARRIER WAVE COMPONENTS IN HORIZONTAL SYNCHRONIZING PULSE MODULATED CARRIER WAVES

This invention relates to a signal receiver for a signal modulated carrier wave having low excess carrier ratios in a vestigial sideband television transmission system, and more specifically to such receiver embodying a circuit for regenerating a carrier wave corresponding to a carrier wave component in the received signal modulated carrier waves during time periods of a preselected synchronizing pulse component for demodulating the received signal modulated carrier waves to detect the modulating signal thereof.

Vestigial sideband television transmission systems are heretofore known for the capability of reducing carrier wave power by over-modulation, i.e., more than 100 per cent, and by securing a high signal-to-noise ratio without overloading the signal transmission line. Conventional vestigial sideband television transmission systems of the suppressed-carrier type in the 6 or 12 mega-Hertz range usually utilize an excess carrier ratio in the range between 0.5 and 0.65. It is well known that in a system transmitting one channel of television signals transmission efficiency is the highest when the carrier wave peak level is the lowest, i.e., when the carrier wave level of a white picture signal is equal to that of the synchronizing signal (horizontal and vertical), or in other words, the excess carrier ratio is equal to 0.5.

In signaling systems wherein several channels of television signals are multiplexed and simultaneously transmitted, complete suppression of the carrier wave component in the transmitted modulated carrier waves is desirable in order to hold the total of the transmitted power to a minimum value. In these systems, however, excess carrier ratio is not fixed but subject to variations from moment to moment in response to changes in the average picture level. Signal modulated carrier waves having complete suppression of carrier wave power are easily provided by removing the direct current component of the modulating signal waves via the use of a high-pass filter and thereafter modulating the output of the high-pass filter with a double-balanced modulator. In typical over-modulation of the carrier waves as obtained in some conventional carrier-suppressed vestigial sideband television transmission systems, phase inversion of the carrier waves occurs not only in the case where the excess carrier ratio is 0.65, i.e., wherein the levels of the modulated carrier in the synchronizing pulse periods (horizontal and vertical) projects beyond the levels of the pedestal and the white picture signal, but also in the case where the excess carrier ratio is 0.5, i.e., the level of the modulated carrier waves corresponding to the level of the peak white picture is equal to the level of modulated carrier waves corresponding to the level of the synchronizing signal (horizontal and vertical). Therefore, carrier-suppressed vestigial sideband television signals must be demodulated at the receiver with a carrier wave precisely phase synchronized with a corresponding carrier wave component in the signal modulated carrier wave supplied to the receiver.

Circuits are heretofore known for regenerating phase-synchronized carrier waves at a television receiver as derived from carrier current bursts extracted thereat from a preselected synchronizing signal (horizontal, for example). These circuits utilize the fact that the phase of the carrier current component in the horizontal synchronizing pulse modulated waves is constant.

One of such heretofore known carrier regenerating circuits involves envelope detection of a received television signal modulated carrier wave whereby the vertical and horizontal synchronizing signals are separated from the detected television signal and utilized to provide the carrier bursts by extracting the portions of the received television signal modulated carrier wave during the periods of the synchronizing signals. This circuit is essentially unworkable for excess carrier ratio 0.5 because separation of the synchronizing signals from the picture signals is practically impossible at the latter ratios. Another known circuit involves the demodulation of the received modulated carrier signal by synchronous detection with a carrier signal which has been regenerated via an appropriate circuit wherein carrier regeneration is effected by separating the synchronizing pulses from the demodulated signal and thereafter extracting the carrier wave component of the received modulated signal in all or certain time periods of the vertical synchronizing period. Therefore, the carrier component with the same phase as that of the horizontal synchronizing period must exist in the vertical synchronizing period.

The present invention therefore provides for the regeneration in a television receiver of a carrier wave phase synchronized with a carrier wave component in received signal modulated carrier waves for use in the demodulation of the received signal modulated carrier waves having small excess carrier wave ratios to detect the modulating signal therein.

A principal object of the present invention is to regenerate in a television receiver a carrier wave phase synchronized with a corresponding carrier wave component in input received signal modulated carrier waves for use in the demodulation of the received signal modulated carrier waves having carrier excess ratios of the order of 0.5 to detect the modulating signal therein.

An additional object is to rapidly resume the regeneration of a carrier wave phase synchronized with a corresponding carrier wave component in received signal modulated carrier wave for use in the demodulation of the received signal modulated carrier wave to detect the modulating signal therein after an interruption of such wave regeneration.

In circuit with a receiver in a vestigial sideband television transmission system for regenerating a carrier wave corresponding to a carrier wave component in a received signal modulated carrier wave during the time periods of preselected synchronizing pulses (horizontal) and phase synchronized with the latter component in such system having carrier wave ratios as low as 0.5, comprising a source of such received modulated carrier wave, a demodulator supplied with one portion of the received signal modulated wave at one input terminal thereof, a load connected to an output terminal of the demodulator, sampling circuit means for translating a second portion of the received signal modulated wave into a train of carrier bursts during time periods of the preselected horizontal synchronizing pulse modulated carrier waves, filter circuit means utilizing one portion of the carrier bursts train to regenerate a carrier wave corresponding to a carrier wave component included in the received signal modulated carrier wave, and an automatic phase control utilizing another portion of the carrier wave bursts train and a first portion of the regenerated carrier wave to supply the regenerated carrier wave first portion phase synchronized with the latter component to a second input terminal of the demodulator for demodulating the received signal modulated carrier wave to detect the modulating signal therein, a specific embodiment of the present invention includes hybrid circuit means for adding a second portion of the regenerated carrier wave of one polarity to a third portion of the received signal modulated carrier wave having a carrier wave component of a polarity the same as the latter one polarity to provide a train of composite pulses synchronized with the preselected horizontal synchronizing signals, and multivibrator circuit means utilizing the composite pulse train to provide a train of further pulses synchronized with the preselected synchronizing pulses for activating the sampling circuit means in synchronism with the preselected horizontal synchronizing pulses.

A feature of the invention concerns a subtraction of detected envelopes of a third portion of the regenerated carrier wave of opposite polarity from detected envelopes of the composite pulses of the one polarity to compensate for variations in the level of the regenerated carrier wave as supplied from the output of the filter circuit means to the adding hybrid circuit means. Another feature is that the regeneration of the carrier wave is automatically resumed after an erroneous operation such as, for example, an interruption of the input signal modulated carrier wave. A further feature is that regeneration of the carrier waves is possible with signal modulated carrier waves having excess carrier ratios as low as 0.5.

Figure 1B:
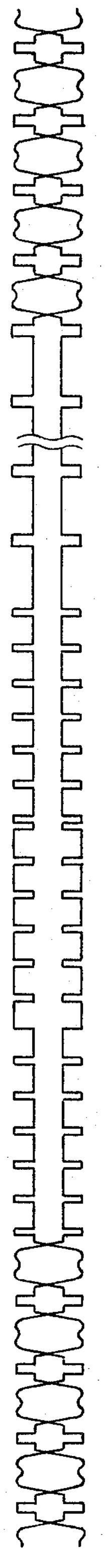
Figure 2:
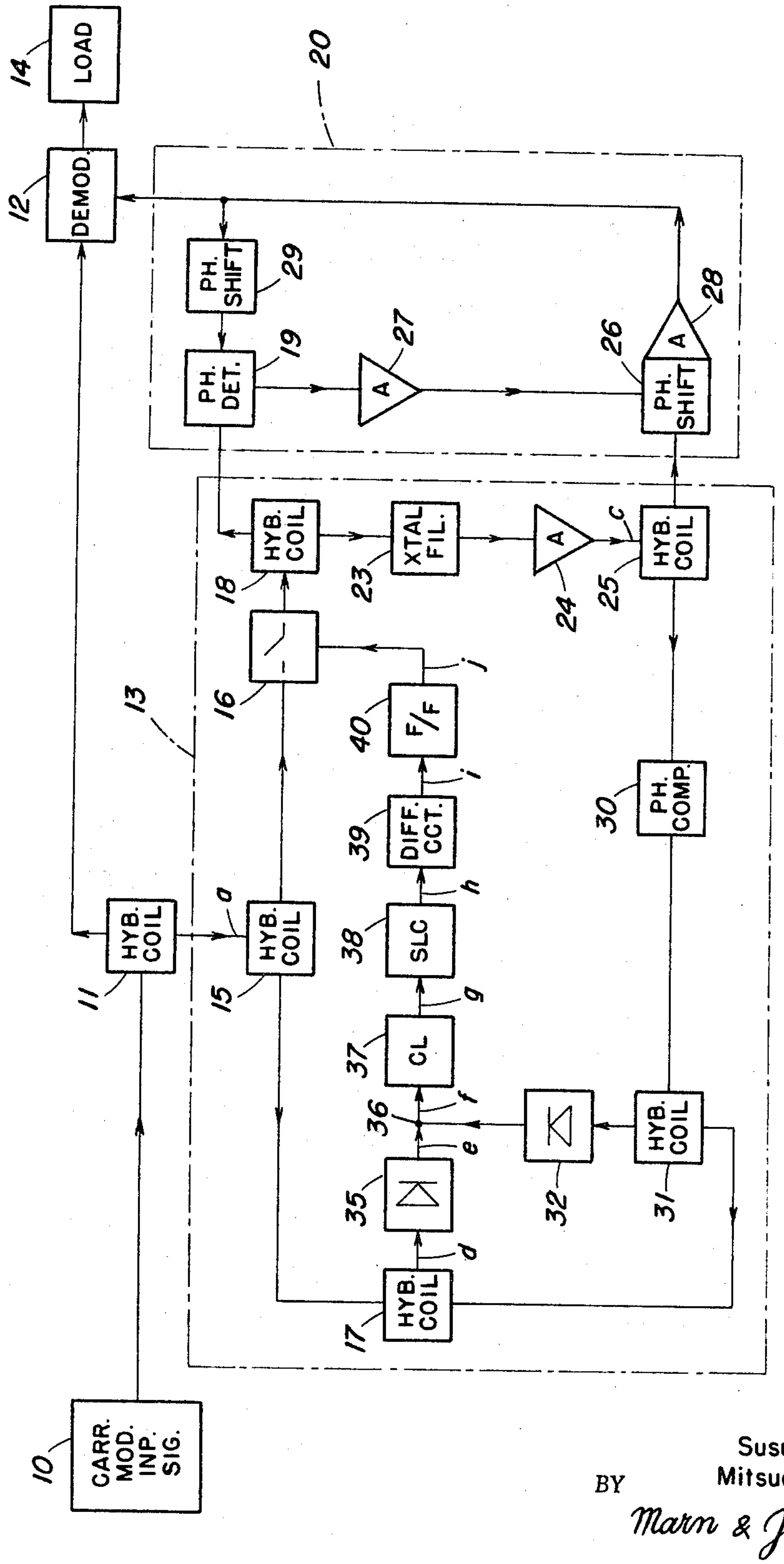

The invention is readily understood from the following description taken together with the accompanying drawing in which:

FIGS. 1*a* and 1*b* comprise two television signal waveforms showing different degrees of carrier modulation;

FIG. 2 is a block diagram of a television signal receiver including a specific embodiment of the invention; and FIGS. 3*a*–3*e*, 3*h*, 3*j*, and 4*a*–4*j* comprise groups of signal waveforms of which particular waveforms are available at different points in FIG. 2.

It is seen in FIG. 1 that, for the purpose of this description, waveforms *a* and *b* illustrate television signals having suppressed-carrier waves whose excess carrier ratios are 0.65 and 0.5, respectively.

Figure 3A:
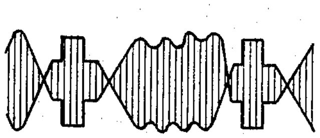

FIG. 2 shows a source 10 supplying an input partially suppressed-carrier vestigial sideband television signal as evidenced in FIG. 3*a* to an input of a hybrid coil 11 having two outputs of which one supplies one portion of the input signal to one input terminal of a suitable television signal demodulator 12 and the other supplies a second portion of the input signal to an input of a carrier wave regenerating circuit 13. A load 14 is connected to an output terminal of the demodulator. Waveform *a* in FIG. 3 is assumed for the purpose of this description to indicate a partially suppressed-carrier vestigial sideband television signal conforming to the requirements of the National Television Standards Committee as currently adopted in the United States and Japan and including horizontal synchronizing pulses as hereinafter specified.

Figure 3B:
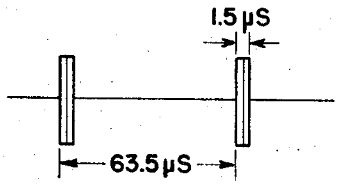

Carrier wave regenerating circuit 13 comprises a hybrid coil 15 whose input receives the second portion of the input signal modulated carrier wave from the second output of hybrid coil 11 and whose first output supplies a third portion of the input signal modulated carrier wave to an input of sampling gate 16 and whose second output supplies a fourth portion of the input signal modulated carrier wave to an input of hybrid coil 17 for a purpose that is subsequently mentioned. The third portion of the input modulated carrier wave is sampled under normal conditions of carrier regeneration by the sampling gate for a time duration of approximately 1.5 microseconds at the repetition rate of 63.5 microseconds of the horizontal synchronizing pulse (or the repetition rate of one-half of 63.5 microseconds during the vertical synchronizing pulse) to produce a train of a bursts of carrier wave of constant polarity and phase with respect to a carrier current component of the horizontal synchronizing pulse included in the signal modulated carrier wave as illustrated in FIG. 3*b*. It is understood that each of such carrier bursts includes unwanted upper and lower sidebands more than 15.75 kilo-Hertz (equal to 63.5 microseconds) off the center frequency thereof. This sampling is thus effected during the time period of each horizontal synchronizing signal.

The carrier bursts train in FIG. 3*b* are supplied to an input of hybrid coil 18 which applies one portion of the latter train as one input to a phase detector 19 included in an automatic phase control 20 and a second portion of the latter train to an input of a narrow pass-band crystal filter 23. This filter attenuates the unwanted upper and lower sidebands to regenerate a carrier wave corresponding to a carrier wave component included in the input signal modulated carrier wave at the time periods of the synchronizing pulse modulation. The regenerated carrier wave amplified in an amplitude-limiting amplifier 24 to provide a constant level thereof embodies the waveform shown in FIG. 3*c* and applied to an input of a hybrid coil 25.

Figure 3C:
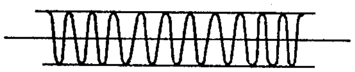

A first portion of the amplified regenerated carrier wave according to FIG. 3*c* and derived from one output of the hybrid coil 25 is supplied as one input of an adjustable phase shifter 26 included in the automatic phase control. Thus, phase shifter 26 receives a second input from an output of a direct voltage amplifier 27 having its input connected to an output of the phase detector 19. The output of phase shifter 26 is applied via amplifier 28 as a second input to demodulator 12 and also as an input to phase shifter 29 whose output serves as the second input to the phase detector 19.

The automatic phase control as disclosed in an article entitled "APC Systems Used in Broadband Carrier Systems for Video Signal Transmission" by M.KAWASHIMA et al., and published in the *IEEE Transactions on Communication Technology*, vol. COM. 15, No. 2, April 1967, pp. 276–285, functions to compensate for phase variations introduced by the crystal filter into the regenerated carrier wave in the following manner. The phase detector compares the phase of the regenerated carrier wave in FIG. 3*c* with the phase of the reference carrier wave component in the successive carrier wave bursts in FIG. 3*b* to produce a direct voltage having a magnitude proportional to the phase difference between the latter component and the regenerated carrier wave. This direct voltage amplified in the direct voltage amplifier activates the phase shifter 26 to adjust the phase of the regenerated carrier wave in FIG. 3*c* to an in-phase relationship with the corresponding carrier wave component in the input signal modulated carrier waves at the time periods of the horizontal synchronizing pulse modulation. It is thus seen that the phase of the regenerated carrier wave supplied to the second input of the demodulator is precisely synchronized with the phase of the carrier wave component in the input signal modulated carrier wave supplied to the first input of the demodulator. It is understood that the structure of the phase shifter 26 may be of a suitable type which, for the purpose of this description, comprises a variable capacity diode of conventional design.

In accordance with a specific embodiment of the invention, a second portion of the amplified regenerated carrier wave per FIG. 3*c* in the second output of hybrid coil 25 is applied through a phase compensator 30 to an input of a hybrid coil 31. This phase compensator compensates for phase shift introduced via the crystal filter and circuit wiring into the regenerated carrier wave. One portion of the regenerated carrier wave per FIG. 3*c* in hybrid coil 31 is supplied by one output to an envelope detector 32 and another portion of the latter wave is supplied by another output of the latter coil to another input of a hybrid 17, which is receiving at one input thereof a fourth portion of the input signal modulated carrier waves through the hybrid coil 15 as previously mentioned.

Figure 3D:
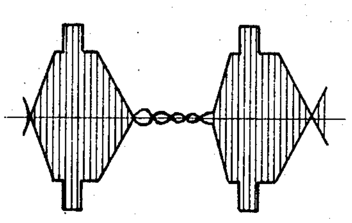

It is understood that the polarity of the regenerated carrier wave in FIG. 3*c* supplied to the hybrid coil 17 is the same as the polarity of the carrier current component in the input signal modulated carrier wave in FIG. 3*a* also supplied thereto whereby the regenerated carrier wave is added to the carrier current component in the latter input waves to produce a composite waveform of the horizontal synchronizing signals in FIG. 3*a* as illustrated in FIG. 3*d*. It is thus seen in the composite waveform *d* in the output of hybrid coil 17 as illustrated in FIG. 3*d* that the level of the carrier wave at the horizontal synchronizing pulses, due to addition of the identical polarity wave, is high, whereas the addition of the regenerated carrier wave of the one polarity and the picture signal waves of opposite polarity produces carrier waves of a low level. In connection with the composite waveform *d* in FIG. 3*d*, it is assumed that the level of the regenerated carrier wave fed back into the hybrid coil 17 is set at such value as to provide an excess carrier ratio of the order of 0.65 in the latter waveform, even if the waveform in FIG. 3*d* is the worst, i.e., the average picture level is low.

Figure 3E:
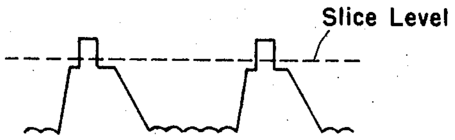

An inspection of the waveform in FIG. 3*d* immediately indicates that the elevation of the horizontal synchronizing signal enables an expeditious separation thereof from the associated carrier wave component. For this purpose, an envelope detector 35 connected in the output of hybrid coil 17 detects the envelopes of the composite waveform *d* shown in FIG. 3d to provide at an output point 36 or e a train of pulses shown in FIG. 3e and synchronized with the horizontal synchronizing signals in the input signal modulated wave in FIG. 3a. A clamper circuit 37 having an input coupled to point 36 and receiving a train of composite pulses as hereinafter specified equalizes the tip ends of the composite pulse train as shown in FIG. 3e to provide an output 4 for slicing at a predetermined level in FIG. 3e via slicer circuit 38. The output h of this slicing circuit provides a train of equalized pulses illustrated in FIG. 3h and synchronized with the horizontal synchronizing pulses in the input signal modulated carrier wave in FIG. 3a.

Figure 3H:
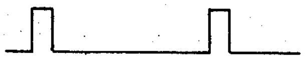
Figure 3J:

Returning now to the envelope detectors 32 and 35, the envelopes of the regenerated carrier wave in FIG. 3c as detected by envelope detector 32 are subtracted from the envelopes shown in FIG. 3d and provided in the output of envelope detector 35 to eliminate variations in the envelopes in FIG. 3d due to changes in the level of the regenerated carrier wave in the output of amplifier 24. This enables an expeditious resumption of the regeneration of the carrier wave as hereinafter explained after an interruption thereof. The pulse train h in FIG. 3h is differentiated via a differentiator circuit 39 to provide a train of sharply peaked or spike output pulses synchronized with the horizontal synchronizing signals in the input signal modulated carrier wave in FIG. 3a. The rising portions of each positive pulse in the latter pulse train activates a monostable multivibrator or flip-flop 40 to provide a train of pulses j shown in FIG. 3j, and synchronized with the last-mentioned horizontal synchronizing signals, each pulse in the pulse train in FIG. 3j having a time duration of approximately 1.5 microseconds. The pulse train j in FIG. 3j is applied to the carrier sampling gate 16 which is thereby synchronized with the horizontal synchronizing signals contained in the input signal modulated carrier wave in FIG. 3a.

Figures 4A, 4B, 4C, 4D, 4E, 4F, 4G, 4H, 4I, 4J:
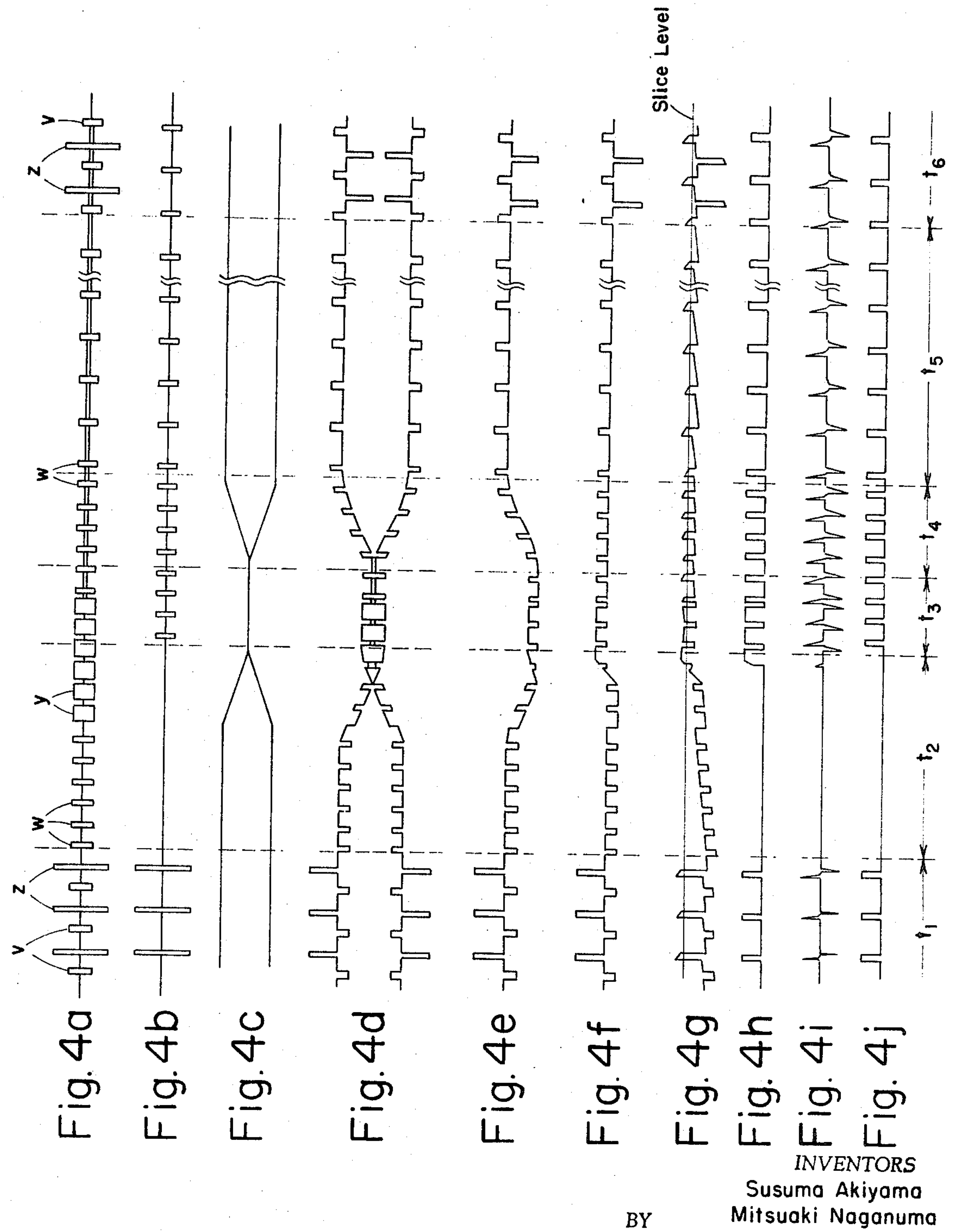

The process of starting or of recovery from an erroneous operation of the carrier wave regeneration circuit 13 is now explained with reference to the signal modulated carrier wave shown in FIG. 4a and associated waveforms illustrated in FIGS. 4b through 4j. In this connection, particular waveforms in FIGS. 4a through 4j are indicated as provided at points in FIG. 2 corresponding with the alphabetical letters a through j. FIG. 4a shows a received completely suppressed carrier vestigial sideband television signal and includes letter v corresponding to horizontal synchronizing signals, letter w to vertical equalizing signals, letter y to vertical synchronizing signals, and letter z to white picture signals. Assuming now that the signal wave portion initially encountered is in the picture signal period of the field and carrier wave in the white signal portion which is opposite in polarity to the carrier wave in the synchronizing signal portion (horizontal and vertical), and therefore the white picture signal portion has been erroneously sampled in the manner described above to regenerate a carrier wave of opposite polarity. Regardless of such erroneous sampling, proper sampling will be performed in the vertical synchronizing pulse period in which the carrier wave of positive polarity is available.

During time interval $t_1$ in FIG. 4 between the arrival of the input modulated signal, and the start of the vertical synchronizing signal, white picture signals z are erroneously sampled. Therefore, the regenerated carrier wave is opposite in polarity to the polarity of the carrier wave component in the input modulated carrier wave whereupon the regenerated carrier wave of inverted polarity is supplied to one input of hybrid coil 17. As a consequence, the composite waveform d in the output of detector 17 is high for the white picture signal portions and low for the horizontal synchronizing signal portions as illustrated in the waveform in time period $t_1$ in FIG. 4d. For this reason, carrier sampling takes place during the white picture signal portions z at time period $t_1$ in FIG. 4a. Upon entering the time period $t_2$ of the vertical synchronizing signals y in FIG. 4a, the peak level of the composite waveform at point 36 or e in FIG. 2 is sharply down whereby the pulse output of the multivibrator 40 is caused to disappear entirely as illustrated in the waveforms in the time period $t_2$ in FIGS. 4e through 4j. As a result, the sampling gate 16 is inoperative to effect sampling of the input signal modulated carrier wave in FIG. 4a available at point a in FIG. 2.

Therefore, the amplitude limiter amplifier 24 begins to attenuate in its output at point c in FIG. 2 as indicated in the waveform in FIG. 4c in time period $t_2$ after an elapse of time equal to the transient delay time of the crystal filter 23 and eventually reduced to zero. As soon as this time period is entered, the envelope for the output d in the hybrid coil 17 will commence to produce projecting synchronizing pulse envelope levels, and therefore the detected envelope output e for the detector 35 includes the detected envelopes shown in FIG. 4e. The level of output e for detector 35 varies according to the amount of attenuation of the regenerated carrier wave as fed with opposite polarity to the input of hybrid coil 17. This variation is cancelled by the output of the envelope detector 32 for the reason hereinbefore explained, thereby stabilizing the voltage of pulse input f to the clamper 37 as illustrated in FIG. 4f. This stabilized input voltage passed through the clamper 37, slicer 38, differentiator 39 and flip-flop 40 in sequence serves to produce the train of pulses shown in FIG. 4j for synchronizing the sampling gate 16 with the horizontal synchronizing signals as hereinbefore explained.

Due to the fact that the sampling gate activating pulses are synchronized in time with the horizontal synchronizing signal time periods, the carrier wave component of positive polarity in horizontal synchronizing signal modulated carrier wave portions is properly sampled via the sampling gate 16. In other words, the amplitude-limiting amplifier 24 begins to regenerate a proper carrier wave (i.e., at constant level) as illustrated in FIG. 4c, after the delay time $t_3$ of the crystal filter 23 has elapsed as indicated by time interval $t_4$ in FIG. 4. As soon as the time interval $t_4$ in FIG. 4 is reached whereat proper carrier wave regeneration is effected, the horizontal synchronizing pulse portion of the output d of hybrid coil 17 begins to project in the manner shown in FIG. 3d. Although the level of output d varies with time, such variations are cancelled by the output of detector 32 as above-mentioned, resulting in perfectly even pulses as indicated in FIG. 4f. This results in a stabilized regenerated carrier wave (i.e., constant level) provided the transient delay time of the crystal filter 23 has elapsed.

Once the regeneration of the carrier wave of constant level is properly effected, the level corresponding to the horizontal synchronizing pulses v in the output hybrid coil 17 is increased while the level corresponding to the white picture signal z is cancelled by the fed back low level regenerated carrier wave to the input of the hybrid coil 17, even if the field interval $t_6$ has been entered. As a consequence, the horizontal synchronizing signals are accurately separated from the input signal modulated carrier wave thereby enabling a continuance of the regeneration of the stabilized carrier wave of constant level.

It is obvious that the starting of carrier wave regeneration is much more stabilized in dealing with similar kinds of partially carrier-suppressed modulated carrier television signals having higher average picture levels or signal modulated carrier wave of fixed excess carrier wave ratios, because the level of the synchronizing pulses (horizontal and vertical) increases above the level of the carrier wave as shown in FIG. 3d.

It is apparent that the principles of the invention are applicable to partially carrier-suppressed demodulating systems not only in the field of television signals but also for signaling systems containing synchronizing signals (horizontal and/or vertical). It is also apparent that the principles of the invention are applicable to demodulating systems involving modulated carrier waves of excess carrier ratios less than 0.5 carrier.

While the principles of the invention are herein described in connection with a receiving terminal connected in a coaxial cable monochrome television transmission system, it is not limited thereto. One skilled in the art readily appreciates that the principles of the invention are easily applicable to the following situations:

1. Color signal transmission — The embodiment of FIG. 2 may be readily adapted for a color transmission system provided an eliminating filter for suppression of the color subcarrier is interposed in the circuit immediately before clamper 37 in FIG. 2;
2. Radio relay transmission — The embodiment of FIG. 2 may be easily applied to multiplex telephone and/or television systems or two-or-more-television-signal microwave radio relay transmission systems in place of coaxial transmission signals thereby requiring the use of waveguide circuit components; and
3. Partially suppressed-carrier modulation systems for other-than-TV-signals containing synchronizing signals such as, for example, facsimile, data, and the like.

It is therefore understood that the invention herein is described in specific respects for the purpose of this description. It is also understood that such respects are merely illustrative of the application of the invention. Numerous other arrangements may be devised by those skilled in the art without departing from the spirit and scope of the invention.

What is claimed is:

1. A receiver regenerating a carrier wave synchronized with a carrier wave component related to a received carrier wave over-modulated by a composite signal containing preselected synchronizing time periods in a partially suppressed carrier vestigial sideband television transmission system, comprising:

a receiving source for said carrier wave over-modulated by said composite signal and containing said preselected synchronizing time periods repeated at a preassigned rate;

a demodulator supplied at one input terminal with one portion of said received signal over-modulated carrier wave;

a load connected to an output terminal of said modulator;

sampling means translating a second portion of said received signal over-modulated carrier wave into a train of carrier wave bursts during said preselected synchronizing time periods;

frequency selective means utilizing one portion of said carrier wave bursts to regenerate a carrier wave corresponding to a carrier wave component related to said received signal over-modulated carrier wave during said preselected synchronizing time periods;

automatic phase control means responsive to a second portion of said carrier wave bursts and one portion of said regenerated carrier wave for supplying said last-mentioned regenerated carrier wave one portion phase synchronized with said carrier wave component to a second input of said demodulator to demodulate said received signal over-modulated carrier wave to detect said modulating composite signal at said load; and pulse producing means coupled to said source and thereby responsive to a third portion of said received signal over-modulated carrier wave and coupled to a second portion of said regenerated carrier wave derived from said frequency selective means for producing a train of further pulses having a repetition time rate coincident with said preassigned repetition time rate of said preselected synchronizing time periods to activate said sampling means to synchronize said carrier wave bursts with said last-mentioned periods.

2. The receiver according to claim 1 in which said sampling means produces said train of carrier wave bursts having unwanted upper and lower sidebands and said frequency selective means includes a narrow pass-band crystal filter for attenuating said sidebands to regenerate said carrier wave corresponding to said carrier wave component related to said received signal over-modulated carrier wave.

3. The receiver according to claim 2 in which said further pulse producing means consists of:

first envelope detecting means energized by said third portion of said received signal over-modulated carrier wave and said second portion of said regenerated carrier wave, both latter waves having the same polarity, for producing a train of first envelopes representing the addition of both said latter waves and synchronized with said preselected synchronizing time periods contained in said received signal over-modulated carrier wave;

second envelope detecting means activated by a third portion of said regenerated carrier wave having a polarity opposite to said one polarity of said third portion of said received signal over-modulated carrier wave for producing a train of second envelopes having said opposite polarity to be subtracted from said first envelopes to produce a train of composite envelopes to compensate for changes in the level of said regenerated carrier wave relative to a predetermined level in the output of said crystal filter due to an interruption of said regenerated carrier wave in said crystal filter output; and additional pulse producing means stimulated by said composite pulse train for producing said further pulse train to activate said sampling means.

4. The receiver according to claim 3 in which said additional pulse producing means contains clamping circuit means energized by said train of composite pulses for equalizing tip ends thereof to provide a train of other pulses synchronized with said preselected synchronizing time periods in said third portion of said received signal over-modulated carrier wave.

5. The receiver according to claim 4 in which said additional pulse producing means includes slicer circuit means for cutting off said equalized tip ends of said other pulses at a predetermined level to provide a train of equalized cut-off tip pulses synchronized with said preselected synchronizing time periods in said third portion of said received signal over-modulated carrier wave.

6. The receiver according to claim 5 in which said additional pulse producing means embodies differentiator circuit means activated by said train of equalized cut-off tip ends for providing a train of oppositely poled spiked pulses synchronized with said preselected synchronizing time periods in said third portion of said received signal over-modulated carrier wave.

7. The receiver according to claim 6 in which said additional pulse producing means includes multivibrator circuit means energized by said train of spiked pulses to provide said train of further pulses to activate said sampling means.

8. The receiver according to claim 7 in which said preselected synchronizing time periods comprise horizontal synchronizing time periods.

9. A receiver regenerating a carrier wave synchronized with a carrier component related to a received carrier wave over-modulated by a composite signal containing horizontal synchronizing time periods in a partially suppressed carrier vestigial sideband television transmission system, comprising:

a receiving source for said carrier wave over-modulated by said composite signal and containing said horizontal synchronizing time periods repeated at a preassigned time rate;

a demodulator having two input terminals and an output terminal;

a load connected to said modulator output terminal;

first hybrid coil means dividing said received signal over-modulated carrier wave into first and second portions of which said first portion is applied to one of said demodulator two input terminals;

second hybrid coil means dividing said first hybrid coil means second portion of said received signal over-modulated carrier wave into two further portions thereof;

sampling means translating one of said two further portions of said received signal over-modulated carrier wave at said second hybrid coil means into a train of carrier wave bursts, each including unwanted upper and lower sidebands relative to a predetermined frequency;

third hybrid coil means dividing said train of carrier wave bursts into two portions;

frequency selective means utilizing one of said two portions of said carrier wave burst train at said third hybrid coil means to regenerate a constant level carrier wave having said predetermined frequency and corresponding to a carrier wave component related to said received signal over-modulated carrier wave during said horizontal synchronizing time periods;

fourth hybrid coil means dividing said regenerated carrier wave into two portions;

automatic phase control means responsive to the other of said two portions of said third hybrid coil means carrier wave burst train and one of said two portions of said fourth hybrid coil means regenerated carrier wave for supplying said last-mentioned regenerated carrier wave one portion phase synchronized with said carrier wave component to a second of said demodulator inputs to demodulate said received signal over-modulated carrier wave to detect said composite signal at said load; and pulse producing circuit means activated by the other of said two further portions of said received signal over-modulated carrier wave at said second hybrid coil means and the other of said regenerated carrier wave two portions at said fourth hybrid coil means for producing a train of other pulses to synchronize said carrier burst train with said horizontal synchronizing time periods, including:

fifth hybrid coil means dividing said regenerated carrier wave other portion at said fifth hybrid coil means into two additional portions thereof;

sixth hybrid coil means responsive to the other of said second hybrid coil means two portions of said received signal over-modulated carrier wave having said carrier wave component thereof in one polarity and one of said two additional regenerated wave portions at said fifth hybrid coil means with a polarity the same as said last-mentioned one polarity for adding said last-mentioned other and one additional wave portions to provide a train of composite waveforms during said horizontal synchronizing time periods;

first envelope detecting means activated by said composite waveform train to provide a train of composite envelopes synchronized with said horizontal synchronizing time periods;

second envelope detecting means activated by the other of said two additional portions in a phase opposite to the phase of said one additional portion at said fifth hybrid coil means to provide a train of envelopes of said other additional portions in a phase opposite to the phase of said train of composite envelopes whereby said other additional envelope train is subtracted from said composite envelope train to provide a train of difference envelopes in response to variations in the level of said regenerated carrier wave at said fourth hybrid coil means and in synchronism with said horizontal synchronizing time periods; and multivibrator means energized by said difference pulse train for providing said train of other pulses synchronized with said horizontal synchronizing time periods to activate said sampling means to synchronize said carrier wave bursts with said last-mentioned periods.

10. The receiver according to claim 9 in which said multivibrator means includes:

clamping circuit means energized by said train of difference pulses for equalizing tip ends thereof to provide a train of equalized pulses synchronized with said horizontal synchronizing time periods in said third portion of said received signal over-modulated carrier waves at said sixth hybrid coil means;

slicer circuit means for cutting off said equalized tips of said train of equalized pulses at a predetermined level to provide a train of equalized cut-off tip pulses synchronized with said last-mentioned horizontal synchronizing time periods;

differentiator circuit means activated by said train of equalized cut-off tip pulses to provide a train of oppositely poled spiked pulses synchronized with said last-mentioned horizontal synchronizing time periods; and a multivibrator circuit energized by said train of spiked pulses for providing said train of other pulses synchronized with said horizontal synchronizing time periods to activate said sampling means to synchronize said carrier wave bursts with said last-mentioned time periods.

* * * * *